United States Patent [19]

Brodbeck et al.

[11] Patent Number: 4,592,205

[45] Date of Patent: Jun. 3, 1986

[54] LOW PRESSURE CRYOGENIC LIQUID DELIVERY SYSTEM

[75] Inventors: Howard D. Brodbeck, Berwyn; Martin A. Krongold, Aston, both of Pa.

[73] Assignee: MG Industries, Valley Forge, Pa.

[21] Appl. No.: 691,386

[22] Filed: Jan. 14, 1985

[51] Int. Cl.$^4$ ............................................. F17C 13/02
[52] U.S. Cl. ........................................ 62/49; 62/55; 137/436; 137/587; 137/589; 137/592
[58] Field of Search ...................... 62/55, 49; 137/434, 137/436, 587, 589, 592

[56] References Cited

U.S. PATENT DOCUMENTS

| | | | |
|---|---|---|---|
| 1,942,944 | 1/1934 | Smith | 62/1 |
| 1,943,047 | 1/1934 | Updegraff | 62/1 |
| 2,729,948 | 1/1956 | Northgraves | 62/1 |
| 2,908,145 | 10/1959 | Haumann | 62/51 |
| 3,049,887 | 8/1962 | Sharp et al. | 62/55 |
| 3,222,578 | 12/1965 | Thiele | 62/51 |
| 3,440,829 | 4/1969 | Davies-White | 62/51 |
| 3,633,372 | 1/1972 | Kimmel et al. | 62/55 |
| 3,696,627 | 10/1972 | Longsworth | 62/51 |
| 3,827,246 | 8/1974 | Moen | 62/50 |
| 3,858,404 | 1/1975 | Davis | 62/51 |
| 3,938,347 | 2/1976 | Riedel et al. | 62/55 |
| 4,313,306 | 2/1982 | Torre | 62/51 |
| 4,334,410 | 6/1982 | Drumare | 62/55 |
| 4,336,689 | 6/1982 | Davis | 62/55 |

Primary Examiner—Ronald C. Capossela
Attorney, Agent, or Firm—William H. Eilberg

[57] ABSTRACT

A low pressure delivery system for cryogenic liquids is disclosed, the system being capable of providing a stream of a single-phase cryogenic liquid at a substantially constant low pressure, in the range of about 1 psi. The system comprises a container into which a cryogenic liquid, from a high pressure source, is directed. The liquid in the container is maintained at a substantially constant level by an automatic filling mechanism. The liquid does not occupy all the space within the container, the remainder of the space being filled by gas evaporating from the liquid. This gas communicates, by a suitable conduit, with a pressure regulator valve. When the gas pressure exceeds a predetermined level, the valve opens, relieving the excess pressure. By thus placing an upper bound on the gas pressure, the system places an upper bound on the pressure of the liquid withdrawn from the container. The automatic filling mechanism of the system establishes a lower bound on the liquid pressure.

22 Claims, 1 Drawing Figure

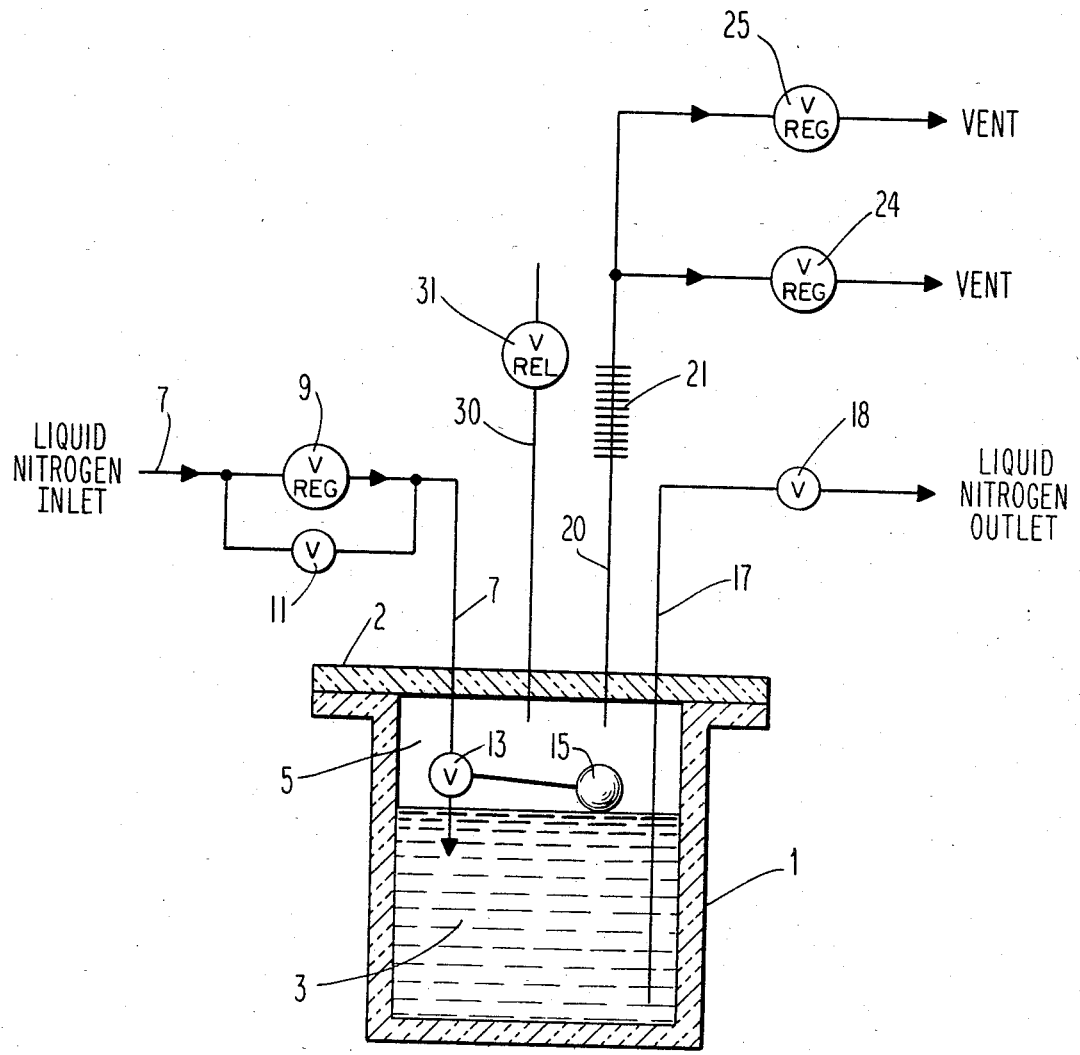

LOW PRESSURE CRYOGENIC LIQUID DELIVERY SYSTEM

BACKGROUND OF THE INVENTION

The present invention relates to the field of delivery of cryogenic liquids, and comprises a unique system for delivering such liquids at controlled low pressures.

A cryogenic liquid, such as liquid nitrogen, is typically stored at high pressures, of the order of 25 psi, or even 100 psi. Many industrial processes require liquid nitrogen to be delivered at very low and precisely-controlled pressures, of the order of 1-5 psi.

One process requiring a cryogenic liquid at a precisely controlled pressure is the filling of aluminum cans. Because of its relatively low cost, aluminum is desirable as a packaging material for foods and beverages. But aluminum, being a soft metal, deforms easily when subjected to pressure. Unless the aluminum can is filled with a carbonated liquid, which provides sufficient internal pressure to resist external forces, the can is not easily stacked. When stacking is attempted, the cans near the bottom of the stack bend under the overall weight of the stack.

To increase the capacity of an aluminum can to withstand higher pressures, a small but controlled amount of liquid cryogen is injected into the can before it is sealed. The liquid cryogen vaporizes inside the can. Because the volume of the vapor is of the order of about 700 times the volume of the liquid cryogen, the pressure in the can is substantially increased, and the can is now able to resist substantial external pressures. The gas resulting from the injected liquid cryogen thus serves the same function as the gas in a canned carbonated beverage.

The machinery used to fill aluminum cans with liquid cryogens is designed to operate at a certain rate of mass flow. The mass flow rate of liquid cryogen depends directly on the pressure in the delivery line. It is therefore important not only to deliver the cryogen in a single phase, i.e. liquid, but also to control precisely the pressure in the delivery line. Deviation of the pressure in the line, from the desired value, causes the wrong amount of liquid cryogen to be injected into the can, and can result in an unacceptable internal can pressure.

Various means of delivering cryogenic liquids have been described in the prior art. For example, U.S. Pat. No. 3,696,627 shows a system for transferring a cryogenic liquid at constant temperature, pressure, and flow rate. The patent discloses a structure comprising a transfer tube which is jacketed within a second tube, substantially along its entire length. U.S. Pat. No. 3,827,246 discloses another device for controlling pressure of cryogenic liquids, the device employing means for recirculating part of the output fluid into the container. The latter invention, however, maintains the cryogenic fluid at very high, and not low pressures.

U.S. Pat. No. 4,336,689 discloses a method of delivering cryogenic liquids at a constant flow rate. The means of regulation is primarily a throttling valve, which reduces the rate of flow from the high pressure source. U.S. Pat. No. 3,440,829 discloses another pressure regulating system which increases the gas head pressure as a means of maintaining the pressure of the output liquid at a desired minimum level.

The present invention provides a system for delivering liquid cryogens at a controlled low pressure, the system being comparatively simple of construction, and inexpensive to operate. The system regulates the pressure of the liquid in part by regulating the pressure of the gas located above the liquid.

SUMMARY OF THE INVENTION

The present invention comprises an insulated container into which a liquid cryogen, such as liquid nitrogen, is delivered. The cryogen is taken from a source at a very high pressure, of the order of 25 psi or greater, and passed through a cryogenic pressure reducing valve. The level of liquid cryogen inside the container is maintained substantially constant, by means of a float valve assembly, which automatically opens the delivery line when the liquid level becomes too low. The liquid level is chosen such that less than the entire space within the container is filled with liquid. The space above the liquid is occupied by a gas "head", i.e. gas which has vaporized from the liquid. Liquid cryogen is withdrawn from the apparatus through an output line communicating with the bottom region of the container.

A conduit communicates with the gas head space within the container, and is connected to a pressure regulating valve. When the gas head pressure, within the container, exceeds an adjustable, predetermined value, the pressure regulating valve automatically opens, allowing the gas to vent to the outside. The venting of some of the gas from the inside of the container causes some of the liquid in the container to vaporize, thereby slightly reducing the liquid level, and reducing the output pressure of the liquid. The system thus places an upper bond on the liquid pressure by preventing the gas pressure from exceeding a preset value.

If the liquid level in the container drops below the desired level, either because of excessive venting of gas, or because of heat leaks, the float valve initiates delivery of more liquid cryogen into the container. The system therefore places a lower limit on the output pressure, which limit will be maintained as long as there is more liquid cryogen available.

The conduit leading to the pressure regulating valve is equipped with heat exchange means, whereby the gas leaving the container is warmed by ambient air. The pressure regulating valve therefore need not be a cryogenic valve, though a cryogenic valve can be used if desired. It is generally preferable to use a more inexpensive valve, which is designed to handle gases at non-cryogenic temperatures.

It is therefore an object of the present invention to provide a system for delivery of cryogenic liquids at a controlled low pressure.

It is another object of the invention to provide a system as described above, wherein the output pressure of the cryogenic liquid is controlled by controlling the pressure of the gas head above the liquid.

It is another object of the invention to provide a system as described above, wherein the system uses a non-cryogenic valve as a means of regulating the pressure of the gas above the cryogenic liquid.

It is another object of the invention to provide a system as described above, the system being suitable for operation in conjunction with machinery requiring delivery of liquid cryogens at a substantially constant mass flow rate.

Other objects and advantages of the invention will be apparent to those skilled in the art, from a reading of the following brief description of the drawing, the detailed description of the invention, and the appended claims.

BRIEF DESCRIPTION OF THE DRAWING

The FIGURE is a schematic diagram of the present invention, showing the container for cryogenic liquids, and the various valves and conduits necessary for proper operation.

DETAILED DESCRIPTION OF THE INVENTION

The FIGURE illustrates, in schematic form, the elements of the present invention. While the FIGURE is labeled to show liquid nitrogen entering and exiting the system, it is understood that the invention may be used to deliver any other liquid cryogen at precisely controlled low pressures. Other liquefied gases which can be delivered by the system of the present invention include, for example, argon, oxygen, carbon dioxide, helium, hydrogen, freon, and propane.

Container 1, which holds the liquid nitrogen 3, is an insulated vessel, preferably of the vacuum-insulated type, suitable for maintaining liquids at temperatures of the order of about −320° F. the container is provided with lid 2. The liquid nitrogen in container 1 does not occupy the entire space within the container, but defines space 5 in which gaseous nitrogen is held. Although the depth of the liquid in the container is not critical, it is important that there be some space remaining above the liquid, to insure that the liquid does not try to overflow the container, and to provide some space for a gas head to form.

Liquid nitrogen is carried into the system through inlet line 7. Typically, the liquid nitrogen entering at line 7 comes from a pressurized gas cylinder, and its pressure may be 25 psi, or even as high as 100 psi. Cryogenic pressure reduction valve 9 reduces the pressure of the liquid by at least an order of magnitude, from about 25 psi to about 2 psi. Valve 11 is also a valve capable of handling cryogenic liquids, and is used to permit rapid filling of the container. Valve 11 is therefore normally closed, and is used to bypass pressure reduction valve 9 when needed, such as when the container is being filled.

Connected to inlet line 7 is float valve 13, which is in turn connected to float ball 15. Valve 13 opens and closes inlet line 7 in response to vertical movement of float ball 15. Valve 13 is a proportional valve; that is, it controls continuously the amount of liquid permitted to flow out of line 7, according to the displacement of float ball 15 from the desired level. The farther the vertical distance of the ball from the desired liquid level, the greater the flow permitted from line 7, and vice versa.

Output line 17 is provided to conduct liquid nitrogen from the apparatus. Line 17 draws liquid nitrogen ffrom the region near the bottom of container 1, where the nitrogen exists in a single phase, i.e. liquid. Shut-off valve 18 is normally open during operation, but would be closed when it is necessary to stop the flow of liquid out of the system.

Conduit 20 communicates with the inside of container 1. The end of conduit 20 is positioned to lie within gas head space 5 within the container. Conduit 20 is connected to heat exchanger 21, which may comprise a simple coil in the conduit itself, or a set of fins attached to the conduit. It is also possible that the conduit itself may be the heat exchanger, the gas within the conduit receiving heat from the outside air. In any case, the heat exchanger enables the cryogenic gas within conduit 20 to become warmed by ambient air.

Connected to conduit 20 is pressure regulator valve 24. Valve 24 is designed to open when the pressure in the line exceeds an adjustable, predetermined value. It is desirable that this pressure be set at a level which is slightly below the pressure at the container side of valve 9. Thus, if valve 9 reduces the pressure of the input liquid to a valve of about 2 psi, the pressure at valve 24 should be allowed to be slightly lower than 2 psi, but not appreciably lower.

Auxiliary valve 25 is also connected to conduit 20. Valve 25 operates in a manner similar to that of valve 24, except that valve 25 is preset to open at somewhat higher pressure. If, as in the example given above, valve 24 is set to open at a pressure slightly lower than 2 psi, then valve 25 would be set to open at about 3 psi. Auxiliary valve 25 is intended to relieve excess gas pressure when the container is being filled, and is unlikely to open at other times. However, the valve 25 is still capable of opening at any time, and therefore enhances the safety and reliability of the apparatus, by providing reserve capacity when valve 24 is overloaded.

Both valves 24 and 25 are non-cryogenic valves. That is, they are valves which are not designed to handle cryogenic liquids or extremely low-temperature gases. Heat exchanger 21, by warming the gas leaving the container, insures that the temperature of the gas, by the time it reaches the valves, will not be below the temperature capacity of the valves.

The system is also provided with overpressure safety relief valve 31, connected to conduit 30 to the head space 5 within the container. Valve 31 operates only in emergency situations, and is set to vent at comparatively high pressures.

In operation, when the liquid pressure becomes too high, albeit by a small amount, the pressure in the gas head space is also somewhat elevated. When this gas pressure reaches the preset limit of valve 24, the valve opens, relieving the pressure in the gas head space. A small amount of the liquid nitrogen 3 then vaporizes, reducing the liquid level slightly, and decreasing the pressure of the output liquid. But if the liquid level falls too low, the valve 13 allows additional liquid to enter the container, maintaining the liquid level and therefore placing a lower bound on the output liquid pressure.

The valve 13 also automatically compensates for possible heat leaks in the container. Heat leaks cause the liquid to vaporize, increasing the head space and decreasing the depth of the liquid. Under these conditions, the container will be automatically refilled due to the operation of valve 13.

In an alternative embodiment, float valve 13 can be a valve which is capable of reducing the pressure of the liquid coming from the source, and which also allows cryogenic liquid to flow therethrough at a relatively high rate. In this embodiment, valves 9 and 11 can be eliminated, because their functions are assumed by valve 13.

In another alternative embodiment, auxiliary valve 25 can be eliminated, as long as pressure regulator valve 24 is designed with sufficient capacity.

In still another alternative embodiment, safety relief valve 31 can be connected directly to the input side (the left side, as shown in the FIGURE) of valves 24 and 25. In this embodiment, relief valve 31 is positioned above heat exchanger 21, and preferably at the end of conduit 20 nearest to valve 25. Because it is positioned above the heat exchanger, valve 31 need not be a cryogenic valve, since the fluid passing through the valve would already have been vaporized. This embodiment has the advantage of reducing the number of required penetrations of the lid of the container. Each penetration, of course, increases the likelihood of unwanted heat leaks. With the relief valve so positioned, there would be only three penetrations of the lid.

The system thus regulates the pressure of the liquid nitrogen by regulating the gas pressure in the space above the liquid, within the container. Regulation of this gas pressure provides a means of "fine tuning" the output liquid pressure, and thereby achieving the necessary precision in that pressure.

While the output from the system is entirely in the liquid phase, if the point of ultimate use is any appreciable distance from the apparatus, evaporation is likely to occur in the line. Therefore, in applications requiring a single-phase cryogenic liquid, it is necessary to provide another phase separator at or near the point of use.

It is apparent that the objects of the invention are fulfilled by the above disclosure. It is understood, however, that the invention may be modified in many ways. For example, the choices of input and output pressures indicated in the above disclosure are not critical. The type of container used can be changed, as long as it is capable of providing the necessary insulation. The system may be provided with additional safety and shut-off valves, as desired. These and other modifications are to be deemed within the spirit and scope of the following claims.

What is claimed is:

1. Apparatus for delivery of cryogenic liquids at controlled low pressures, comprising:
    (a) first conduit means for conveying a cryogenic liquid into the apparatus,
    (b) container means for storing the cryogenic liquid delivered by the first conduit means,
    (c) means for maintaining a substantially constant level of cryogenic liquid in the container means, the level being chosen such that the liquid occupies less than the entire space within the container means,
    (d) pressure regulator valve means, connected for actuation only by the pressure of the gas in the space within the container above the cryogenic liquid, for regulating the gas pressure in said space above the liquid, and
    (e) second conduit means for conveying cryogenic liquid out of the apparatus.

2. The apparatus of claim, further comprising an auxiliary valve means, the auxiliary valve means being connected to the same source of gas as the pressure regulator valve means and connected in parallel thereto, the auxiliary valve means being preset to open at a pressure which is higher than the pressure at which the pressure regulating valve is set to open.

3. The apparatus of claim 2, wherein the first conduit means includes pressure reduction valve means for reducing the pressure of the incoming liquid while the liquid is still outside of the container means.

4. The apparatus of claim 3, wherein the pressure reduction valve means comprises a cryogenic valve, capable of reducing the pressure of an incoming fluid stream by about one order of magnitude.

5. The apparatus of claim 3, wherein the level-maintaining means comprises a float ball and a float valve, the float valve being capable of allowing liquid into the container means at varying flow rates.

6. The apparatus of claim 5, wherein the pressure regulator valve means communicates with the inside of the container means by a gas conduit means, the gas conduit means including heat exchange means for warming the gas within the gas conduit means.

7. The apparatus of claim 2, wherein the level-maintaining means comprises a float ball and a float valve, and wherein the float valve comprises pressure reduction valve means for reducing the pressure of the incoming liquid.

8. A system for delivering a cryogenic liquid at a substantially constant low pressure, comprising:
    (a) an insulated coantainer for storing the cryogenic liquid,
    (b) means for maintaining the liquid level within the container at a present height, the level-maintaining means being capable of adding liquid to the contained when the level of the liquid therein falls below the preset height,
    (c) a gas conduit, adapted to direct gas from the space above the liquid level, within the container, out of the container,
    (d) the gas conduit communicating with a pressure regulating valve, the pressure regulating valve being preset to open when the pressure in the gas conduit exceeds an adjustable, predetermined value, the pressure regulating valve being responsive only to the pressure in the gas in said space above the liquid level, and
    (e) conduit means for withdrawing liquid from the container.

9. The system of claim 8, wherein the gas conduit also communicates with an auxiliary valve, the auxiliary valve being connected in parallel with the pressure regulating valve, the auxiliary valve being preset to open at a gas pressure which is greater than the pressure at which the pressure regulating valve is set to open.

10. The system of claim 9, wherein the gas conduit is adapted to pass its contents through a heat exchanger, the heat exchanger being located between the container and the pressure regulator and auxiliary valves.

11. Apparatus for dispensing a cryogenic liquid at a precisely controlled low pressure, the apparatus comprising:
    (a) an insulated container,
    (b) an inlet line, the inlet line having a cryogenic pressure-reduction valve,
    (c) the inlet line being connected to a float valve, the float valve being adapted to maintain the level of liquid in the container at a predetermined height,
    (d) a gas conduit communicating with the gas above the liquid in the container, the gas conduit being connected to a pressure regulator valve and an auxiliary valve, the pressure regulator and auxiliary valves being connected in parallel, and being adapted to open when the pressure in the conduit reaches a preset level, the pressure regulator valve being preset to open at a lower conduit pressure than the auxiliary valve, and
    (e) an outlet line for withdrawing liquid from the container.

12. The apparatus of claim 11, further comprising safety relief valve means connected to the pressure regulator valve.

13. The apparatus of claim 11, further comprising safety relief valve means connected directly through the container.

14. A method for delivering a stream of cryogenic liquid at substantially constant low pressure, comprising the steps of:
  (a) maintaining the level of cryogenic liquid at a predetermined height within a container, the level being maintained such that the liquid occupies less than all the space within the container,
  (b) continuously monitoring the pressure of the gas in the above liquid within the container,
  (c) venting the gas from the space above the liquid within the container, when the gas pressure exceeds a preset limit, the venting step being performed in response only to the monitored gas pressure in said space above the liquid, and
  (d) withdrawing cryogenic liquid from the container.

15. A method for delivering a stream of cryogenic liquid at a constant low pressure, comprising the steps of:
  (a) maintaining the level of a cryogenic liquid in a container at a preset depth, by adding liquid from an external source when the depth of the liquid in the container falls below the desired value,
  (b) venting gas from the space above the liquid in the container when the pressure of the gas exceeds a predetermined value, the venting step being performed only to the value of the pressure of the gas in said space above the liquid, and
  (c) withdrawing the liquid from the container.

16. A method for delivering a stream of cryogenic liquid at a constant low pressure, comprising the steps of:
  (a) maintaining the level of a cryogenic liquid in a container at a present depth, by adding liquid from an external source when the depth of the liquid in the container falls below the desired value,
  (b) venting gas from the space above the liquid in the container through a first relief valve when the pressure of the gas exceeds a first predetermined value, the venting step being performed in response to the value of the pressure of the gas in said space above the liquid,
  (c) venting gas from the space above the liquid in the container through a second relief valve when the pressure of the gas exceeds a second predetermined value, and
  (d) withdrawing the liquid from the container.

17. Apparatus for delivery of cryogenic liquids at controlled low pressures, comprising:
  (a) first conduit means for conveying a cryogenic liquid into the apparatus,
  (b) container means for storing the cryogenic liquid delivered by the first conduit means,
  (c) means for maintaining a substantially constant level of cryogenic liquid in the container means, the level being chosen such that the liquid occupies less than the entire space within the container means,
  (d) pressure regulator valve means, communicating with the space within the container above the cryogenic liquid, for regulating the gas pressure in said space above the liquid,
  (e) secoand conduit means for conveying cryogenic liquid out of the apparatus, and
  (f) an auxiliary valve means, the auxiliary valve means being connected to the same source of gas as the pressure regulator valve means and connected in parallel thereto, the auxiliary valve means being preset to open at a pressure which is higher than the pressure at which the pressure regulating valve is set to open,
  wherein the first conduit means includes pressure reduction valve means for reducing the pressure of the incoming liquid while the liquid is still outside of the container means, wherein the level-maintaining means comprises a float ball and a float valve, the float valve being capable of allowing the liquid in the container means at varying flow rates, and wherein the pressure regulator valve means communicates with the inside of the container means by a gas conduit means, the gas conduit means including heat exchange means for warming the gas within the gas conduit means.

18. The apparatus of claim 17, further comprising bypass means for diverting liquid around the pressure reduction valve means, the bypass means adapted to facilitate rapid filling of the container means.

19. A system for delivering a cryogenic liquid at a substantially constant low pressure, comprising:
  (a) an insulated container for storing the cryogenic liquid,
  (b) means for maintaining the liquid level within the container at a preset height, the level-maintaining means being capable of adding liquid to the container when the level of the liquid therein falls below the preset height,
  (c) a gas conduit, adapted to direct gas from the space above the liquid level, within the container, out of the container,
  (d) the gas conduit communicating with a pressure regulating valve, the pressure regulating valve being preset to open when the pressure in the gas conduit exceeds an adjustable, predetermined value, and
  (e) conduit means for withdrawing liquid from the container, wherein the gas conduit also communicates with an auxiliary valve, the auxiliary valve being connected in parallel with the pressure regulating valve, the auxiliary valve being preset to open at a gas pressure which is greater than the pressure at which the pressure regulating valve is set to open, and wherein the gas conduit is adapted to pass its contents through a heat exchanger, the heat exchanger being located between the container and the pressure regulator and auxiliary valves.

20. The system of claim 19, wherein the level-maintaining means comprises a float valve and a float ball, the float valve being connected to an input conduit.

21. The system of claim 20, wherein the input conduit includes a cryogenic pressure-reduction valve.

22. The system of claim 20, wherein the float valve comprises a cryogenic pressure-reduction valve.

* * * * *